(No Model.)
J. STAHL.
TWO WHEELED VEHICLE.
No. 447,499. Patented Mar. 3, 1891.
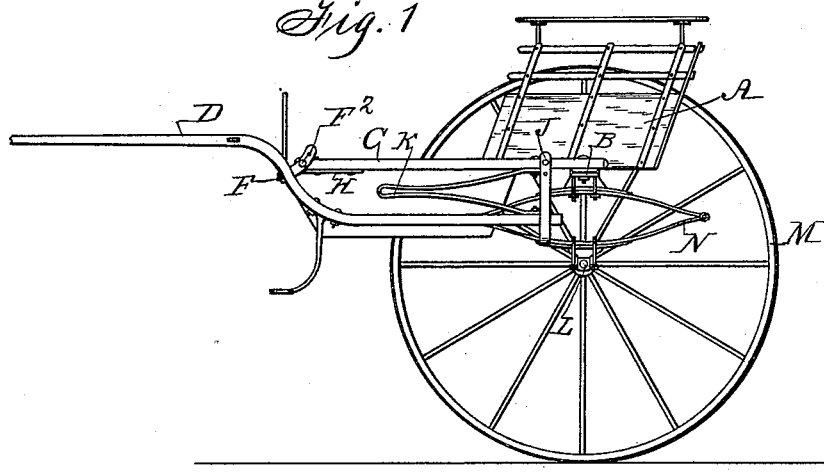
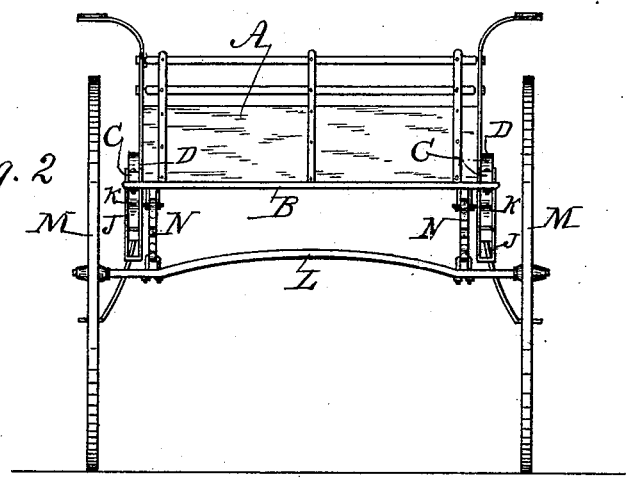
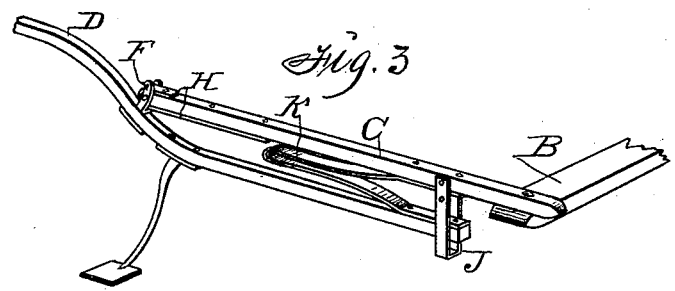
Witnesses:
Inventor:
John Stahl
By Thomas G. Orwig, Attorney.

United States Patent Office.

JOHN STAHL, OF GRINNELL, IOWA, ASSIGNOR OF ONE-HALF TO EDGAR W. STAHL, OF SAME PLACE.

TWO-WHEELED VEHICLE.

SPECIFICATION forming part of Letters Patent No. 447,499, dated March 3, 1891.

Application filed November 21, 1890. Serial No. 372,144. (No model.)

*To all whom it may concern:*

Be it known that I, JOHN STAHL, a citizen of the United States of America, and a resident of Grinnell, in the county of Poweshiek and State of Iowa, have invented an Improved Two-Wheeled Vehicle, of which the following is a specification.

The object of my invention is to provide improved means to neutralize the movement that would otherwise be imparted to a two-wheeled vehicle by the motion of the horse.

My invention consists in the construction of a two-wheeled vehicle in which the side bars are connected to the thills in such a manner as to allow the rear ends of said thills to have vertical movement independently of the body, bar, or axle.

My invention consists, further, in the construction of thills, the rear and forward portions of which are in different horizontal planes and connected by doubly-curved portions, to which latter portions the forward ends of the side bars are adjustably fixed while the rear ends of the said thills are confined against lateral movement by depending hangers adjustably fixed to the rear ends of the said side bars.

My invention consists, further, in the interposition of a spring between the thills and the said side bars and in the provision of means for regulating the tension of said spring to suit the varying weights contained in the vehicle.

Referring to the accompanying drawings, Figure 1 is a side view of a vehicle embodying my improvements, one wheel thereof being removed. Fig. 2 is a rear view of the complete vehicle embodying my invention. Fig. 3 is a detail perspective view of a section of one of the thills and a side bar coupled together and having a spring interposed between them.

A represents the vehicle-body of any suitable form, which body has a cross-bar B fixed beneath its bottom and projecting past the sides thereof, as shown in Fig. 2. The devices on each side of the body being alike I will describe only those on the side presented to view.

C represents a side bar, one end of which rests upon and is fixed to the projecting end of the bar B. The opposite end portion of this bar C is fixed to the side of the body A.

D represents a thill made of a bent wooden bar, the forward and rear portions of which are in different horizontal planes and connected by a doubly-curved portion.

F represents a bolt having a bifurcated head, the shank of which bolt is passed downward through the doubly-curved portion of the thill at right angles thereto. The arms of the bifurcated head of this bolt are pierced by a plurality of coinciding perforations adapted to admit a pin $F^2$ to connect the bolt F with an eye-plate H, which eye-plate is fixed to the forward end of the side bar C.

J represents a hanger made of a single piece of bar-iron, the sides of which are parallel and the bottom closed to receive and stop the downward movement of the rear end of the thill. The upper portion of each of the parallel sides of this hanger is pierced by a series of pairs of coinciding perforations adapted to admit a pin $J^2$ to attach said hanger to the rear end portion of the side bar C.

K represents a semi-elliptic spring interposed between and fixed to the rear end portion of the thill and the side bar, the normal tendency of which spring is to hold the rear end of the thill in a position intermediate between the closed lower end of the hanger and the side bar C.

L represents an axle supported on carriage-wheels M and attached to the body A by elliptic springs N.

In the practical use of my invention the tension of the semi-elliptic spring K may be regulated by inserting the pin $F^2$ or $J^2$ in different pairs of coinciding perforations in the head and hanger, thus providing means to overcome the discomforts incident to varying weights with which the vehicle may be loaded. By the use of the devices described the body A and its occupants are supported by the wheels, axles, springs, and cross-bars in a common way, and the tilting motion of said body is limited by the attachment of the forward end of the side bars to the thill. The up and down motion of the horse in progress alternately depresses and elevates the rear ends of the thills, and the jolting that would be otherwise occasioned thereby is limited or neutralized by the semi-elliptic spring; and by reason of the position of the rear end of the thills intermediate between the closed end of the hanger and the side bar, and also by reason of the peculiar shape of the thills and method of attaching said thills to the side bars, none of the said horse motion is imparted to the body of the vehicle.

I claim as my invention—

1. In a two-wheeled vehicle, side bars fixed to the body thereof, hangers adjustably depending from said side bars, thills adjustably fixed to said side bars and projecting rearward from the point of junction therewith and confined within the hangers, and yielding pressure interposed between the side bars and the rearwardly-projecting portion of the the thills, as shown and described.

2. In a two-wheeled vehicle, a device for neutralizing the horse motion comprising thills, the forward and rear portions of which are in different horizontal planes and connected by a double curved portion, side bars shackled at their forward ends to the curved portion of the thills at a point intermediate between the forward and rear portions of said thills, hangers depending from the rear portion of said side bars confining the rear end portion of the thills, yielding pressure interposed between the rear portions of the thills and the side bars, and means for regulating the tension of said yielding pressure, as and for the purposes stated.

3. In combination with the side bars of a vehicle, thills each having a double curved portion adjustably fixed to the adjacent side bar, and a rearwardly-extending straight portion confined within a hanger adjustably fixed to said side bar, as shown and described, for the purposes stated.

4. In a two-wheeled vehicle, a device for overcoming the horse motion, consisting of thills having two straight portions in different horizontal planes connected by a double curved portion, means for connecting each of said curved portions the front end of the adjacent side bar, a hanger adjustably fixed to and depending from each of said side bars and confining the rear end portion of the adjacent thill, together with a semi-elliptic spring fixed to and interposed between said side bars and the rearwardly-projecting portion of the thills, as and for the purposes set forth.

JOHN STAHL.

Witnesses:
E. W. STAHL,
GEO. H. HAMLIN.